United States Patent [19]

Thiele et al.

[11] Patent Number: 5,490,665
[45] Date of Patent: Feb. 13, 1996

[54] PIVOTABLE STOP FOR MACHINE TOOLS

[75] Inventors: Siegfried Thiele; Rolf Tweer, both of Minden, Germany

[73] Assignee: Wilhelm Altendorf GmbH & Co. KG, Minden, Germany

[21] Appl. No.: 437,693

[22] Filed: May 9, 1995

Related U.S. Application Data

[63] Continuation of Ser. No. 212,359, Mar. 14, 1994, abandoned.

[30] Foreign Application Priority Data

Mar. 16, 1993 [DE] Germany ............................ 93 03 843.7

[51] Int. Cl.⁶ ..................................................... B23Q 3/00
[52] U.S. Cl. ........................... 269/303; 269/307; 269/315
[58] Field of Search ..................................... 83/467.1, 468, 83/468.2, 468.7, 522.11, 522.17, 522.18, 522.19, 522.21; 269/303, 304, 307, 315

[56] References Cited

U.S. PATENT DOCUMENTS 4,238,718 12/1980 Wepner et al. .................... 83/468.7
4,653,371 3/1987 Vancalbergh .......................... 269/303
5,215,296 6/1993 Adams et al. .......................... 269/303

FOREIGN PATENT DOCUMENTS 9114150 2/1992 Germany .
9207797 10/1992 Germany .

*Primary Examiner*—Robert C. Watson
*Attorney, Agent, or Firm*—Schweitzer Cornman & Gross

[57] ABSTRACT

A pivotable stop for machine tools, in particular panel saws, having a striker bar, on which a first stop flap is mounted in a longitudinally displaceable but fixed manner, and is connected to a measurement and display unit which determines and displays the relative position of the stop flap to the striker bar, and in which a rod can telescopically be extended and retracted, which bears a second stop flap at its free end, characterized in that a coupling placed at the measurement and display unit detachably connects the rod to the measurement and display unit.

6 Claims, 3 Drawing Sheets

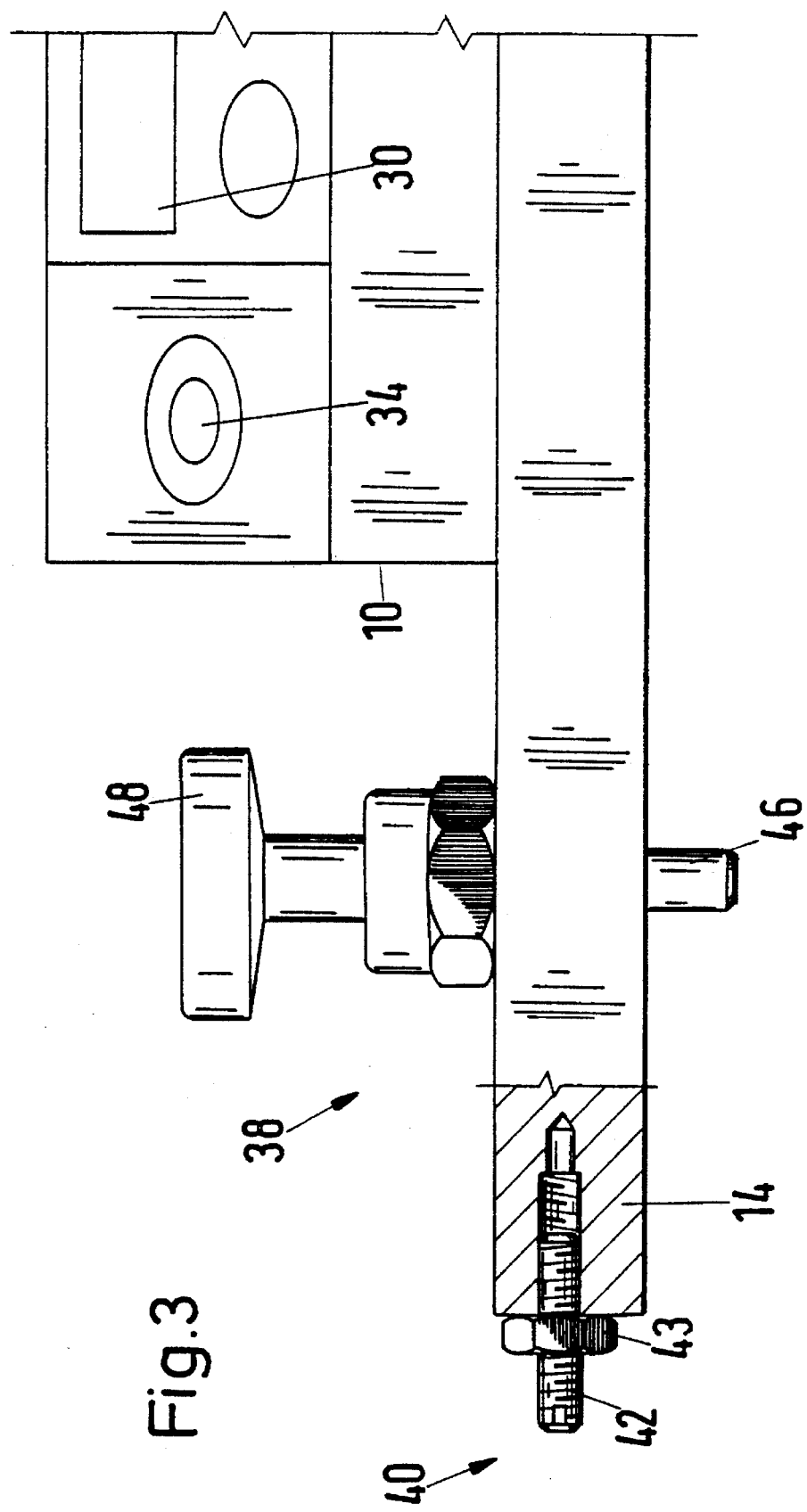

PIVOTABLE STOP FOR MACHINE TOOLS

This application is a continuation of Ser. No. 08/212,359 filed Mar. 14, 1994 and now abandoned.

BACKGROUND AND SUMMARY OF THE INVENTION

The invention relates to a crosscut fence for machine tools, in particular panel saws, having a guide bar, on which a first pivotable throwover stop or workstop abutment is mounted in a longitudinally displaceable but fixed manner, and is connected to a measurement and display unit which determines and displays the relative position of the pivotable throwover stop to the guide bar, and in which a rod can be telescopically extended and retracted and which at its free end bears a second pivotable throwover stop.

So that it is possible to manufacture dimensionally accurate workpieces by means of machine tools, the blanks to be machined are positioned by means of so-called stops on the machine, after said stops have been adjusted according to the desired dimensions of the workpiece.

Panel saws are primarily used to cut to size panels, boards and battens from wood or plastic, for example by means of angular cuts, parallel cuts and cuts along the grain. In this case a so-called crosscut fence or left-hand stop is used to adjust the desired material dimensions, which essentially consists of a guide bar mounted on the cross slide and at least one pivotable throwover stop, against which the workpiece abuts during cutting to size.

As is known, mechanical or electronic measurement systems are used to adjust and indicate the distance from a pivotable throwover stop to the cutting tool. An electronic measurement system may consist of, for example, a magnetically coded measuring tape mounted along the guide bar, a sensor which is connected to a pivotable throwover stop and scans the measuring tape without contact and also a switching arrangement processing the readings recorded by the sensor and a display unit optically representing the distance measurement (German Utility Model 91 14 150.8).

The utilisation of several fold-down pivotal throwover stops disposed on a guide bar is also known for different measuring ranges. In this case a first displaceable pivotable throwover stop can be connected to a sensor recording its relative position and a second pivotable throwover stop can be securely connected to a telescopic rod which is mounted in a telescopic and displaceable manner inside the guide bar. With such a stop, to determine the distance of the two pivotable throwover stop with an electronic system, a measuring tape on the telescopic rod and the guide bar and also two sensors are required, as a result of which the manufacturing costs are relatively high (German Utility Model 92 07 797.8).

The object of the invention is to make available a crosscut fence which can be manufactured at a favourable cost, with which the relative positions of several pivotable throwover stop can be simply determined and adjusted in relation to the operation in various measuring ranges by means of a single measurement and display unit and a measuring tape.

The object is achieved by a crosscut fence of the above-mentioned type in that a coupling placed at the measurement and display unit detachably connects the rod with the measurement and display unit. By such a mechanical coupling the relative positions of two pivotable throwover stop can be determined and also adjusted by simple means and in particular independently of one another with only one sensor and a magnetically coded measuring tape.

The coupling advantageously consists of a stop bolt, which can move transversally to the longitudinal axis of the rod and which can be introduced into a bore in the rod, as a result of which a coupling is produced in a simple manner, which, for example, can be manually operated with a knob.

With the engagement of the coupling, the measuring range of the measurement and display unit is advantageously switched over to the second pivotable throwover stop, as a result of which this can be quickly adjusted to the desired distance, in particular with a frequent change-over between the measuring ranges. The change-over may be performed, for example, by an electrical switch on the coupling.

An embodiment in which the connection between the first pivotable throwover stop and the measurement and display unit is detachable is also advantageous, so that, after the first pivotable throwover stop has been fixed in the desired position, the adjustment of the second or a further pivotable throwover stop can be performed by coupling the measurement and display unit, without the first stop, which has already been fixed, having to be moved again.

An advantageous refinement lies in that the rod with the second stop flap can be stopped in relation to the striker bar so that the second pivotable throwover stop can be fixed in the desired position on the guide bar by a clamping device which is easy to operate.

With a pivotable stop, in which a third pivotable throwover stop is guided in a longitudinally displaceable manner on the guide bar and can be stopped in relation thereto and can also be coupled to the measurement and display unit, three distance measurements of the pivotable throwover stop from the tool can be adjusted in different measuring ranges and be activated by folding down the pivotable throwover stops. If the coupling for the third pivotable throwover stop consists of a drag stop which only responds to pressure, with the abutment of which the third pivotable throwover stop has a defined distance from the first pivotable throwover stop the adjustment of the third pivotable throwover stop can be achieved in a particularly simple manner and as a result of the fact that the drag stop is adjustable.

A fast exchange of the measuring range is possible if the pivotable throwover stops can be swivelled in a known manner out of an active position into an inoperative position and their swivelling changes the measuring range of the measurement and display unit, for example by electromagnetic switches, and if, when the drag stop is adjacent, the measuring range of the measurement and display unit is switched over to the third pivotable throwover stop.

The present invention is described below for the sake of example with reference to the attached drawings.

DESCRIPTION OF THE DRAWINGS

FIG. 3 shows an adjustable drag stop, a coupling having a stop bolt and also a part of the measurement and display unit.

DETAILED DESCRIPTION OF THE INVENTION

Figure 1:
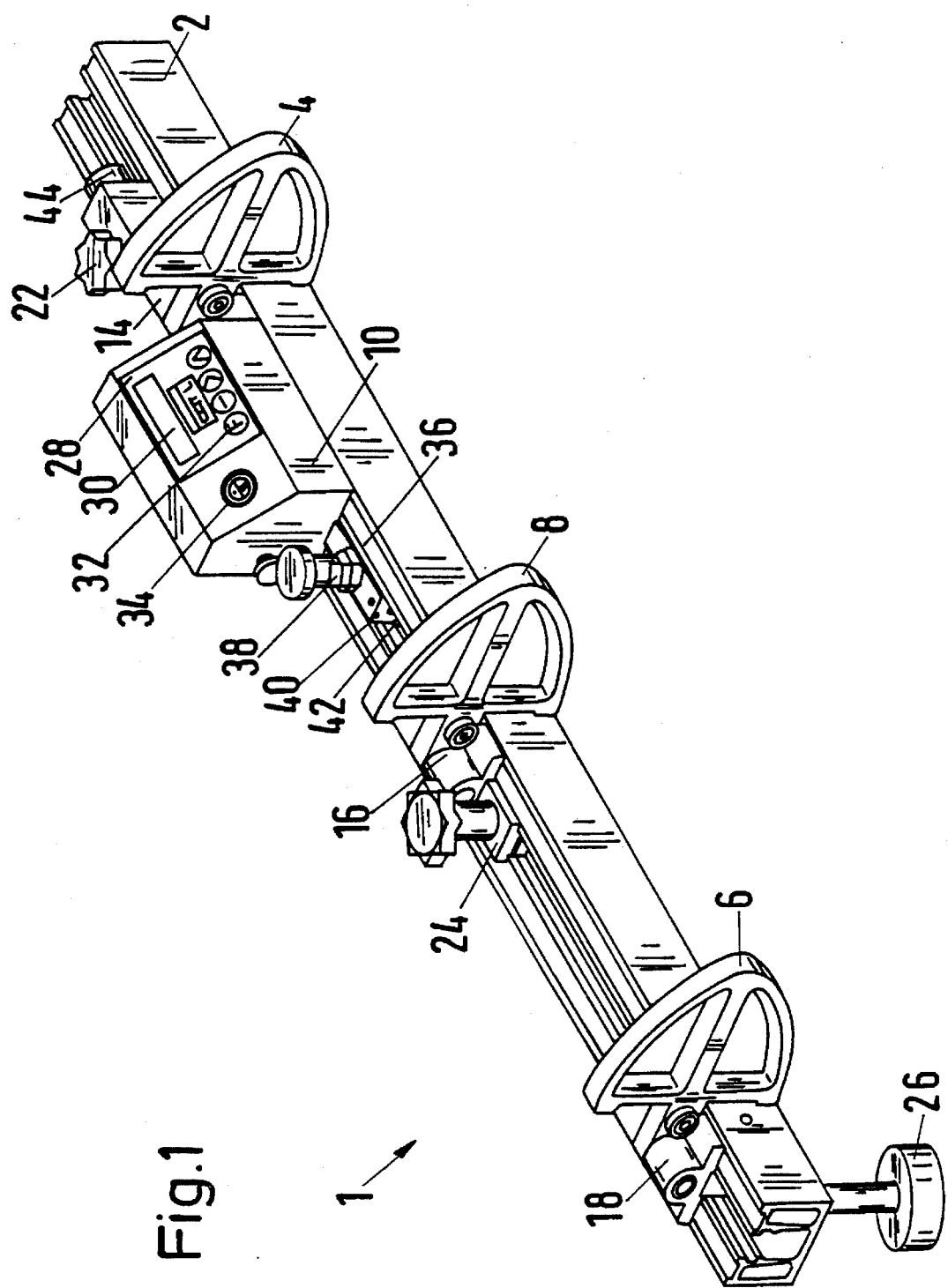
FIG. 1 shows a perspective representation of a preferred embodiment of a crosscut fence having three pivotable throwover stops and FIG. 2 shows an embodiment according to FIG. 1, in which the second pivotable throwover stop is represented in an extended position

The crosscut fence 1 represented in FIG. 1 essentially comprises a guide bar 2, a first pivotable throwover stop 4, a second pivotable throwover stop 6, a third pivotable throwover stop 8, a measurement and display unit 10 and a rod 12 guided inside the guide bar 2 (not represented in FIG. 1, but see FIG. 2), which at its free end bears the second pivotable throwover stop 6. The crosscut fence 1 is slipped onto a cross slide (not represented) of a machine tool, in particular panel saw, and is attached by appropriate devices, for example star grip nuts or control levers. The crosscut fence 1 can be moved by means of the cross slide relative to the driven tool and if necessary can be swivellably mounted to perform mitre cuts.

The pivotable throwover stops 4 and 8 are swivellably attached in a known manner to sliders 14 and 16, which are mounted in a longitudinally displaceable manner on the guide bar 2, and the pivotable throwover stop 6 is also attached in a swivelling manner to a rod carrier 18, which is in turn securely connected to the end of the rod 12 which can be telescopically extended and retracted inside the guide bar 2, which is constructed as a hollow section. Because of the swivelling attachment to the sliders 14 and 16 and respectively to the rod carrier 18, the pivotable throwover stops 4, 8 and 6 can be swivelled out of an active position into an inoperative position, for example by being folded down manually. The pivotable throwover stops 4, 8 and 6 can be immobilised in a continuously adjustable manner in a desired position in relation to the guide bar 2 by means of clamping devices 22, 24 and 26 provided on the sliders 14 and 16 and respectively on the rod carrier 18. The immobilisation facility of the rod with the second pivotable throwover stop 6 can also be achieved in that the clamping device 26 is provided at a position on the guide bar 2 other than that represented, for example close to the measurement and display unit 10. By the clamping devices 22, 24 and 26, which are manually operated by rotating star grip nuts or control levers, the pivotable throwover stops are fixed by a frictional connection.

Figure 2:
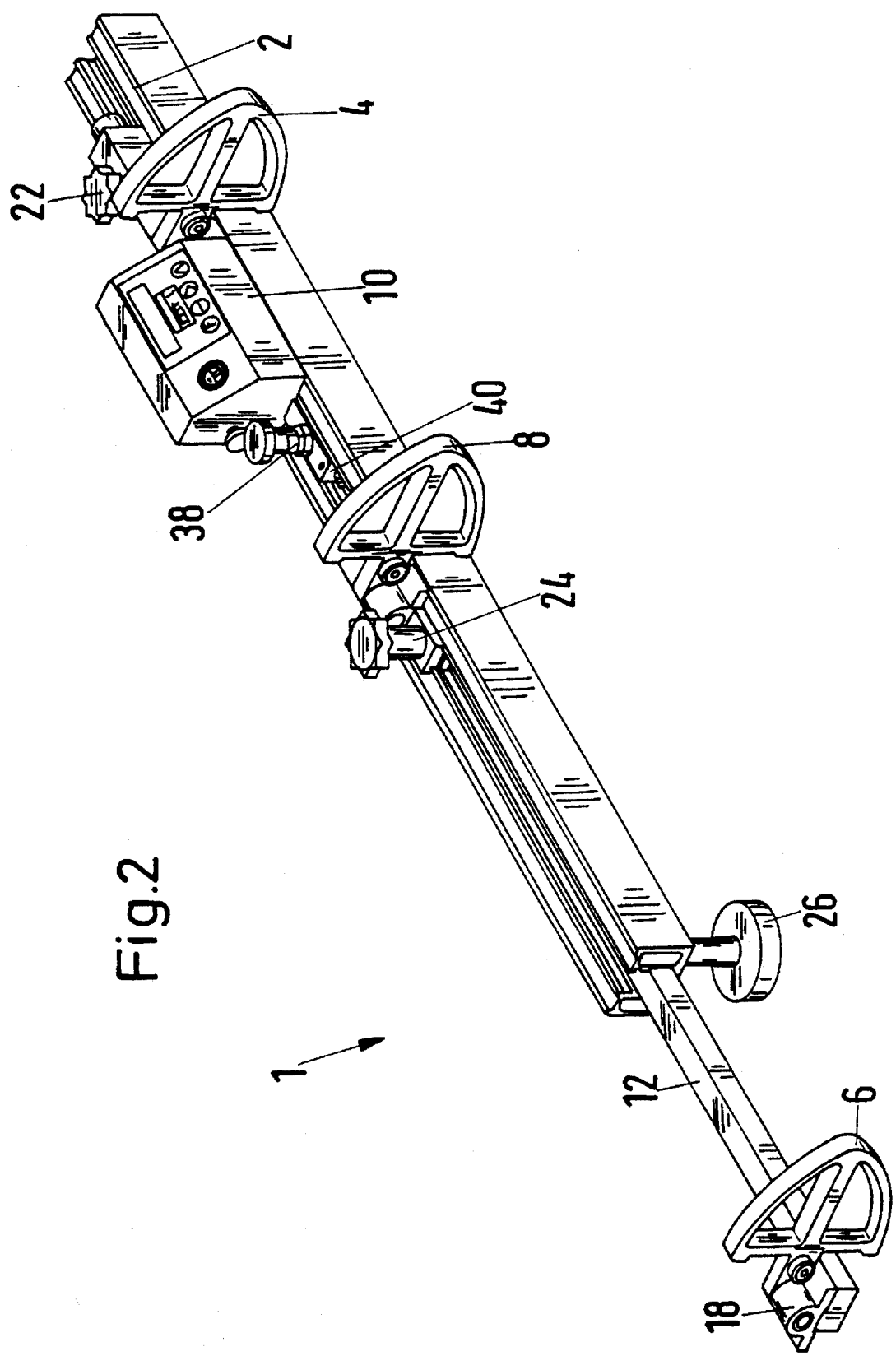

In FIG. 2 the second pivotable throwover stop 6 is represented in an extended position, in which the telescopically extensible rod 12 can be clearly seen.

The measurement and display unit 10, which is mounted in a closed housing, is in this exemplified embodiment attached to the slider 14 and thus connected to the first pivotable throwover stop 4 and can be moved jointly therewith on the guide bar 2. The measurement and display unit 10 comprises a sensor (not represented), a source of electricity, a control and display panel 28, a digital display 30, a keyboard 32 and also a main switch 34. The sensor scans without contact a magnetically coded measuring tape 36 mounted along the guide bar 2, so that the respective relative position of the sensor, and thus of the measurement and display unit 10 and consequently of the first pivotable throwover stop 4, can be determined and indicated by a switching and processor unit also mounted inside the measurement and display unit.

At one end of the slider 14 adjacent to the measurement and display unit 10 is provided a coupling 38 connected therewith, which detachably connects the rod 12 with the measurement and display unit 10 by it being possible to insert a stop bolt 46, which is mounted in an axially displaceable manner and can be moved manually (cf. FIG. 3), into a bore (not represented) disposed transversally to the longitudinal axis of the rod 12 and to remove it therefrom, so that a form-fit connection can be produced. Because it is possible to couple the second pivotable throwover stop 6 connected to the rod to the measurement and display unit 10, by means of said unit its relative position can be determined when the distance of the bore from the pivotable throwover stop 6 is precisely known. Consequently the relative positions of the pivotable throwover stops 4 and 6 in relation to the guide bar 2 can be determined with the measurement and display unit 10 in cooperation with the measuring tape 36. At the coupling 38 there is additionally provided a switch (not represented), by which, when the coupling is engaged, the measuring range of the measurement and display unit 10 is automatically switched to the second pivotable throwover stop 6, so that the distance of the pivotable throwover stop 6 from the tool (not represented) is directly indicated on the digital display 30.

Between the first pivotable throwover stop 4 and the measurement and display unit 10 there can either be a permanent connection, or the connection between these two components can be detachable, for example by a mechanical coupling or a quick-release screw connection, so that the measurement and display unit 10 can be displaced independently of the pivotable throwover stop 4 with the engagement of the coupling 38 together with the second pivotable throwover stop 6 to adjust the second pivotable throwover stop 6, while the first pivotable throwover stop 4 remains in the previously adjusted relative position.

The third pivotable throwover stop 8, which can also be displaced on the guide bar 2, can be coupled by means of a so-called drag stop 40 to the measurement and display unit 10. In this exemplified embodiment the drag stop 40 is also disposed on one end of the slider 14 next to the measurement and display unit 10 at a defined distance to both the first pivotable throwover stop 4 and also to the sensor of the measurement and display unit 10, so that when the drag stop 40 touches the slider 16 and thus the third pivotable throwover stop 8, its relative position is precisely determined. When a drag pivotable throwover stop is used, the stop 8 can only be displaced in one direction to the guide bar 2, whereas with the use of a multi-action coupling which is also possible, the third pivotable throwover stop 8 could be displaced in both directions on the guide bar. The drag stop 40 can be precisely adjusted by means of an adjustment screw 42 and a check nut 43.

In FIG. 3 are represented the drag stop 40, the coupling 38 and a part of the measurement and display unit 10. The drag stop 40 illustrated in the partial section representation, which is disposed at one end of the slider 14, can be adjusted by means of the adjustment screw 42, which is in engagement with a thread cut in the slider 14, and the adjustment screw 42 can be fixed with the check nut 43. In addition the stop bolt 46 of the coupling 38 is represented, which can be axially displaced by actuating a knob 48.

By swivelling the pivotable throwover stops 4, 8 and 6 from their active position into the inoperative position, switches (not represented) are actuated, by which the measuring range of the measurement and display unit 10 is changed. On the drag stop 40 is also provided a switch (not represented), by which the measuring range of the measurement and display unit 10 is switched over to the third pivotable throwover stop 8, if the drag stop 40 is switched to the pivotable throwover stop 8.

In this embodiment the first stop flap 4 has a measuring range of from 140 to 1450 mm, the pivotable throwover stop 8 has a measuring range from roughly 440 to 1450 mm and pivotable throwover stop 6 has a measuring range from roughly 1450 to 2750 mm. By means of the keys 32 the respective position of the pivotable throwover stop can be ascertained by simply switching over. On the slider 14 of the first pivotable throwover stop 4 there is an adjustment screw 44 for fine adjustment.

We claim:

1. A crosscut fence for machine tools, in particular panel saws, having a guide bar, on which a first pivotable throwover stop is mounted in a longitudinally displaceable but fixed manner, and is connected to a measurement and display unit which determines and displays the relative position of the pivotable throwover stop to the guide bar, and in which a rod can be telescopically extended and retracted, which bears a second pivotable throwover stop at its free end, characterized in that a coupling placed at the measurement and display unit detachably connects the rod to the measurement and display unit, and in that the coupling consists of a stop bolt which can move transversely to the longitudinal axis of the rod, and which can be introduced into a bore in the rod.

2. A crosscut fence for machine tools, in particular panel saws, having a guide bar, on which a first pivotable throwover stop is mounted in a longitudinally displaceable but fixed manner, and is connected to a measurement and display unit which determines and displays the relative position of the pivotable throwover stop to the guide bar, and in which a rod can be telescopically extended and retracted, which bears a second pivotable throwover stop at its free end, characterized in that a coupling placed at the measurement and display unit detachably connects the rod to the measurement and display unit, and in that when the coupling is engaged the measuring range of the measurement and display unit can be switched to the second pivotable throwover stop.

3. A crosscut fence for machine tools, in particular panel saws, having a guide bar, on which a first pivotable throwover stop is mounted in a longitudinally displaceable but fixed manner, and is connected to a measurement and display unit which determines and displays the relative position of the pivotable throwover stop to the guide bar, and in which a rod can be telescopically extended and retracted, which bears a second pivotable throwover stop at its free end, characterized in that a coupling placed at the measurement and display unit detachably connects the rod to the measurement and display unit, and in that the coupling consists of a stop bolt which can move transversely to the longitudinal axis of the rod, and which can be introduced into a bore in the rod, and in that when the coupling is engaged the measuring range of the measurement and display unit can be switched to the second pivotable throwover stop.

4. A cross cut fence according to one of claims 1, 2 or 3, characterized in that a third pivotable throwover stop is guided in a longitudinally displaceable manner on the guide bar and can be stopped in relation thereto and can also be coupled to the measurement and display unit.

5. A guide fence for machine tools provided with a plurality of selectively useable and independently adjustable stops and with measurement and display means associated with said stops for indicating the position thereof, wherein (a) a single measurement and display unit is provided for selectively indicating the position of a selected one of said plurality of stops, (b) said measurement and display unit being normally mechanically coupled with a first one of said stops and being movable therewith for indicating the adjusted position thereof, (c) means for mechanically coupling a second one of said stops to said to said measurement and display unit for movement therewith, (d) said first and second stops, when coupled with said measurement and display unit, being positioned at known fixed distances therefrom whereby the positions of said first and second stops can be determined from the position of said measurement and display unit.

6. A guide fence according to claim 5, wherein (a) said stops are pivotally mounted on said guide fence for movement between active and retracted positions, and (b) means are provided for adjusting the measuring range of said measurement and display unit, in response to the pivoting of a selected stop to an active position, to correspond to the range of said selected stop.

* * * * *